US012810288B2

(12) United States Patent
Shanmugam et al.

(10) Patent No.: US 12,810,288 B2
(45) Date of Patent: Nov. 24, 2026

(54) QUANTUM HOLOGRAPHIC SIGNATURE WITH QUANTUM FOURIER SIGNATURE TRANSFORMER AND ENCODING HARMONIZER

(71) Applicant: Bank of America Corporation, Charlotte, NC (US)

(72) Inventors: Ambika Shanmugam, Chennai (IN); Anurajam Rajagopalan, Vengaivasal (IN); Subburathinam Krishnan, Chennai (IN); Durga Prasad Kutthumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 41 days.

(21) Appl. No.: 19/175,057

(22) Filed: Apr. 10, 2025

(65) Prior Publication Data

US 2026/0320592 A1 Oct. 15, 2026

(51) Int. Cl.
*G06Q 20/38* (2012.01)
*G06N 10/20* (2022.01)
(Continued)

(52) U.S. Cl.
CPC ......... *G06Q 20/3825* (2013.01); *G06N 10/20* (2022.01); *G06N 10/60* (2022.01); *G06Q 20/40145* (2013.01); *H04L 9/0852* (2013.01)

(58) Field of Classification Search
CPC ......... G06Q 20/3825; G06Q 20/40145; G06N 10/20; G06N 10/60; H04L 9/0852
See application file for complete search history.

(56) References Cited

U.S. PATENT DOCUMENTS

2006/0230822 A1* 10/2006 Beverly .................. B60T 8/171 73/146
2020/0050959 A1* 2/2020 Ashrafi .................. G06N 3/065
2022/0345863 A1* 10/2022 Mueck ................ H04W 56/001

FOREIGN PATENT DOCUMENTS

CN 114503019 A * 5/2022 ........... H04L 9/0852
CN 111585752 B * 1/2023 ........... H04L 9/0816
WO WO2006/023082 3/2006

OTHER PUBLICATIONS

Howard Barnum et al., "Authentication of Quantum Messages", May 20, 2002 (Year: 2002).*

(Continued)

*Primary Examiner* — Moeen Khan
*Assistant Examiner* — Thomas A Carnes
(74) *Attorney, Agent, or Firm* — Weiss & Arons LLP

(57) ABSTRACT

Apparatus and methods for securing a transaction. The apparatus may include a holographic signature pad. The holographic signature pad may include an array of sensors. The sensors may be configured to sense a first quantum tunneling pattern resulting from interaction between a pen and the signature pad. The pad may be configured to create a holographic interference pattern based on the first quantum tunneling pattern. The apparatus may map the digitized interference pattern onto first qubits in a quantum register. The apparatus may be configured to interact with the quantum computer to apply a quantum Fourier transform algorithm to the first qubits to produce a quantum phase-space interference matrix. The apparatus may be configured to form a key-value pair that includes a key corresponding to a quantum encrypted fingerprint matrix and a value corresponding to the quantum phase-space interference matrix.

20 Claims, 10 Drawing Sheets

(51) Int. Cl.
*G06N 10/60* (2022.01)
*G06Q 20/40* (2012.01)
*H04L 9/08* (2006.01)

(56) References Cited

OTHER PUBLICATIONS

Ryan Amos et al., One-Shot Signatures and Applications to Hybrid Quantum/Classical Authentication, 2020 (Year: 2020).*
Howard Barnum et al., "Authentication of Quantum Messages," arxiv.org/pdf/quant-ph/0205128, May 20, 2002.
Ryan Amos et al., "One-Shot Signatures and Applications to Hybrid Quantum/Classical Authentication," eprint.iacr.org/2020/107.pdf, Year: 2020.

* cited by examiner

QUANTUM HOLOGRAPHIC SIGNATURE WITH QUANTUM FOURIER SIGNATURE TRANSFORMER AND ENCODING HARMONIZER

FIELD OF TECHNOLOGY

Aspects of the disclosure relate to authentication of a party to a transaction using harmonization of a quantum holographic signature and a biometric indication.

BACKGROUND

Typically, there is a risk involved in transactions based on the possibility of forgery of signatures. A forged signature can lead to unauthorized or non-privileged access to funds. Such access may lead to money laundering, financial damage (e.g., from check forgery, fraudulent contracts, and unauthorized transactions), reputation damage (e.g., from undermining customer trust), regulatory consequences (e.g., penalties to an institution for failing to detect or prevent fraud), loss of intellectual property (e.g., from unauthorized use or conveyance of intangible assets), and emotional stress (e.g., emotional distress and frustration from managing consequences of fraud), among other things.

It would be desirable therefore to provide apparatus and methods for securing a transaction.

SUMMARY

Apparatus and methods for securing a transaction are provided.

The apparatus may include a holographic signature pad. The holographic signature pad may include an array of sensors. The sensors may be configured to sense a first quantum tunneling pattern resulting from interaction between a pen and the signature pad. The pen may be a stylus that is configured to interact with the signature pad. The pad may be configured to create a holographic interference pattern based on the first quantum tunneling pattern. The pad may be configured to output a digitized interference pattern corresponding to the interference pattern. The apparatus may include a classical computer. The classical computer may be configured to instruct a quantum computer. The classical computer may be configured to interact with the quantum computer to map the digitized interference pattern onto first qubits in a quantum register. The classical computer may be configured to interact with the quantum computer to apply a quantum Fourier transform algorithm to the first qubits to produce a quantum phase-space interference matrix. The classical computer may be configured to interact with the quantum computer to form a key-value pair that includes a key corresponding to a quantum encrypted fingerprint matrix and a value corresponding to the quantum phase-space interference matrix.

The apparatus may include a quantum vault.

The quantum vault may be configured to house signature archive qubits that are entangled with the quantum phase-space interference matrix. The quantum vault may be configured to house fingerprint archive qubits that are entangled with the quantum encrypted fingerprint matrix.

The quantum vault may be configured to house, in classical memory, classical data corresponding to classical or quantum data that are transmitted via quantum or quantum-encrypted channels to the quantum vault.

The quantum vault may be configured to house, in classical memory, classical data corresponding to the signature archive qubits. The quantum vault may be configured to house, in classical memory, classical data corresponding to the fingerprint archive qubits.

The apparatus may include a pen. The pen may be configured to record a signature on the holographic signature pad. The pen may include a fingerprint sensor. The fingerprint sensor may be configured to acquire a second quantum tunneling pattern based on the fingerprint. The pen may include a circuit that is configured to digitize the second quantum tunneling pattern.

The classical computer may be configured to map the second quantum tunneling pattern onto third qubits in the quantum register. The classical computer may be configured to instruct the quantum computer to encrypt the third qubits to produce the quantum encrypted fingerprint matrix.

The classical computer may be configured to generate the key-value pair. The key may be mapped to the signature archive qubits. The value may be mapped to the fingerprint archive qubits.

The classical computer may be configured to instruct the quantum computer to generate the key-value pair.

The classical computer may be a first classical computer. The apparatus may include a second classical computer. The second classical computer may be configured to instruct the quantum computer to apply quantum error correction to the signature archive qubits. The second classical computer may have one or more features in common with the first classical computer, may be located at a different location from the first classical computer, and may be configured to detect a difference between the signature archive qubits and a proposed quantum signature.

The proposed quantum signature may be a quantum phase-space representation of a signature hologram.

The proposed quantum fingerprint may be a quantum encrypted representation of a fingerprint pattern.

The second classical computer may be configured to apply a large language model to an input. The input may include output from the holographic signature pad. The input may include output from the circuit. The input may include output from a signature verifier that is configured to manipulate and query and qubits in the vault. The input may include user input provided to the signature verifier from a user. The second classical computer may be configured to receive from the large language model a report indicating an abnormal verification.

The second classical computer may be configured to apply a consensus protocol to an input. The input may include output from the holographic signature pad. The input may include output from the circuit. The input may include output from a signature verifier that is configured to manipulate and query and qubits in the vault. The input may include user input provided to the signature verifier from a user. The second classical computer may be configured to receive from the consensus model a report indicating an abnormal verification.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

Figure 1:
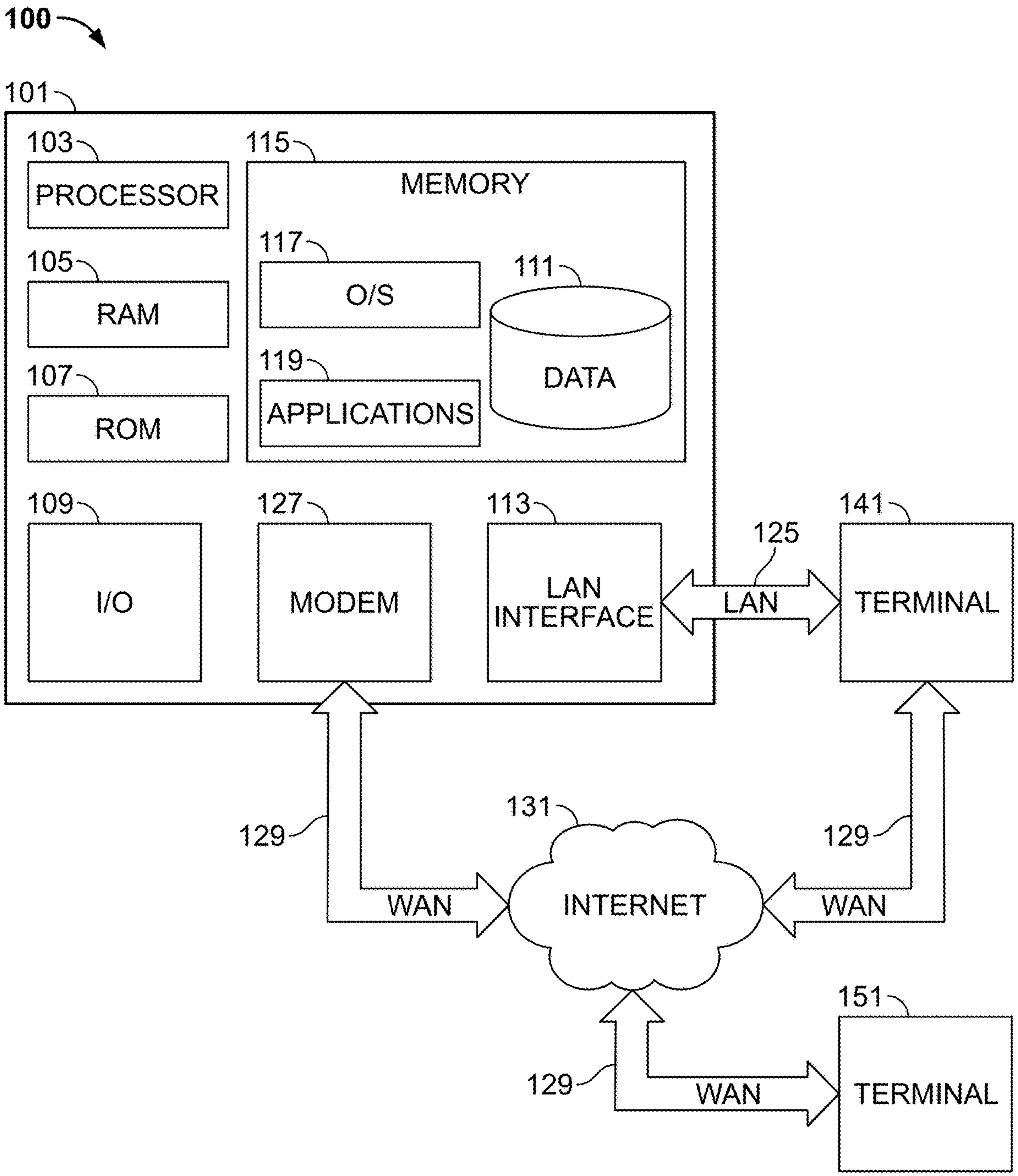
FIG. 1 shows illustrative apparatus that may be used in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the initial figure in which a part is called-out.

DETAILED DESCRIPTION

Apparatus and methods for securing a transaction are provided.

The apparatus and methods may allow a customer to add a quantum based holographic signature to an account profile using a holographic signature pad. Once the customer onboards the signature, the signature may be captured by digital holographic interferometry. The apparatus and methods may perform quantum Fourier transforms, in which quantum signature amplitudes are efficiently decomposed and encoded. The apparatus and methods may use quantum teleportation, which may require that the signature be in an entangled quantum state. The apparatus and methods may encode a quantum decomposed signature and store it in a quantum vault or quantum wallet.

A user's identity authentication may be captured for user evaluation. The identity may be based on any suitable identity, including biometric information. The biometric information may be any suitable biometric information from any suitable feature of the body, including fingerprint, deoxyribonucleic acid ("DNA"), eye anatomy, dental anatomy, skin tissue, hair tissue, bone structure or any other suitable feature. The identity authentication may be encoded to generate a key value pair through biometric feature. The authentication may be confirmed through consensus techniques.

The methods may use spontaneous parametric down conversion may to cojoin identity authentication, such as a fingerprint, and a quantum holographic signature, as "key" and "value" to store them in the vault or wallet. The contents of the vault or wallet may be subjected to periodic evaluation with a quantum secured authorizer to screen for fraud.

When, after storage of the fingerprint and the signature in the wallet or vault, a user initiates a transaction using identity authentication, such as a fingerprint, the apparatus and methods may confirm authenticity of the fingerprint using a quantum Fourier signature transformer encoded harmonizer.

To authenticate a transaction signature, an entangled photon may be transmitted to the quantum signatory wallet to confirm agreement with a corresponding quantum holographic signature.

The methods may provide secured digital signing using quantum based holographic signature ("QHS") combined with a user personality Identity Quantum authentication.

The signature may be digitized through digital holographic interferometry. The signature may be augmented and encoded in by quantum Fourier transformation. No further processing of the signature may be required. Once entangled, the signature may be transmitted securely. Quantum teleportation may avoid network eavesdropping.

The apparatus may include a quantum signatory wallet that is a secure way of packaging and storing a quantum signature with reduced or eliminated exposure to digital hacking techniques.

A user identity authentication, such as a fingerprint may be encoded using identity harmony to strengthen a supplementary authentication layer. Spontaneous parametric down conversion may merge identity (e.g., fingerprint), as a "key" and QHS (e.g., quantum holographic signature), as a "value" to form an amalgamated authentication of a user in one or more entangled quantum photons.

Identity harmonizer QHS may execute all security checks thereby approving or disapproving the QHS checkout process for any transaction.

The QHS may be periodically changed thereby enabling security in the encoding of qubits. The harmonized signature may be validated and authorized by a quantum secure authorizer of an institution to ensure the validity of a signature.

The apparatus may include a holographic signature pad. The holographic signature pad may include an array of sensors. The sensors may be configured to sense a first quantum tunneling pattern resulting from interaction between a pen and the signature pad. The pen may be a stylus that is configured to interact with the signature pad. The pad may be configured to create a holographic interference pattern based on the first quantum tunneling pattern. The pad may be configured to output a digitized interference pattern corresponding to the interference pattern. The apparatus may include a classical computer. The classical computer may be configured to instruct a quantum computer. The classical computer may be configured to interact with the quantum computer to map the digitized interference pattern onto first qubits in a quantum register. The classical computer may be configured to interact with the quantum computer to apply a quantum Fourier transform algorithm to the first qubits to produce a quantum phase-space interference matrix. The classical computer may be configured to interact with the quantum computer to form a key-value pair that includes a key corresponding to a quantum encrypted fingerprint matrix and a value corresponding to the quantum phase-space interference matrix.

The apparatus may include a quantum vault.

The quantum vault may be configured to house signature archive qubits that are entangled with the quantum phase-space interference matrix. The quantum vault may be configured to house fingerprint archive qubits that are entangled with the quantum encrypted fingerprint matrix.

The quantum vault may be configured to house, in classical memory, classical data corresponding to classical or quantum data that are transmitted via quantum or quantum-encrypted channels to the quantum vault.

The quantum vault may be configured to house, in classical memory, classical data corresponding to the signature archive qubits. The quantum vault may be configured to house, in classical memory, classical data corresponding to the fingerprint archive qubits.

The apparatus may include a pen. The pen may be configured to record a signature on the holographic signature pad. The pen may include a fingerprint sensor. The fingerprint sensor may be configured to acquire a second quantum tunneling pattern based on the fingerprint. The pen may include a circuit that is configured to digitize the second quantum tunneling pattern.

The classical computer may be configured to map the second quantum tunneling pattern onto third qubits in the quantum register. The classical computer may be configured to instruct the quantum computer to encrypt the third qubits to produce the quantum encrypted fingerprint matrix.

The classical computer may be configured to generate the key-value pair. The key may be mapped to the signature archive qubits. The value may be mapped to the fingerprint archive qubits.

The classical computer may be configured to instruct the quantum computer to generate the key-value pair.

The classical computer may be a first classical computer. The apparatus may include a second classical computer. The second classical computer may be configured to instruct the quantum computer to apply quantum error correction to the signature archive qubits. The second classical computer may have one or more features in common with the first classical computer, may be located at a different location from the first classical computer, and may be configured to detect a difference between the signature archive qubits and a proposed quantum signature.

The proposed quantum signature may be a quantum phase-space representation of a signature hologram.

The proposed quantum fingerprint may be a quantum encrypted representation of a fingerprint pattern.

The second classical computer may be configured to apply a large language model to an input. The input may include output from the holographic signature pad. The input may include output from the circuit. The input may include output from a signature verifier that is configured to manipulate and query and qubits in the vault. The input may include user input provided to the signature verifier from a user. The second classical computer may be configured to receive from the large language model a report indicating an abnormal verification.

The second classical computer may be configured to apply a consensus protocol to an input. The input may include output from the holographic signature pad. The input may include output from the circuit. The input may include output from a signature verifier that is configured to manipulate and query and qubits in the vault. The input may include user input provided to the signature verifier from a user. The second classical computer may be configured to receive from the consensus model a report indicating an abnormal verification.

The methods may include receiving a user signature at a holographic signature pad. The methods may include acquiring a first quantum tunneling pattern based on the signature. The methods may include creating a holographic interference pattern based on the first quantum tunneling pattern. The methods may include digitizing the interference pattern to create a digitized interference pattern. The methods may include mapping the digitized interference pattern onto first qubits in a quantum register. The methods may include applying a quantum Fourier transform algorithm to the first qubits to produce a quantum phase-space interference matrix. The methods may include forming a key-value pair that includes a key corresponding to a quantum encrypted fingerprint matrix and a value corresponding to the quantum phase-space interference matrix. The methods may include teleporting the quantum phase-space interference matrix to second qubits in a quantum signature vault. The methods may include recording or logging the key-value pair in the quantum signature vault.

The methods may include receiving a user fingerprint at a sensor on a pen that is configured to record a signature on the holographic signature pad.

The methods may include acquiring a second quantum tunneling pattern based on the fingerprint.

The methods may include digitizing the second quantum tunneling pattern.

The methods may include mapping the second quantum tunneling pattern onto third qubits in the quantum register.

The methods may include encrypting the third qubits to produce the quantum encrypted fingerprint matrix.

The methods may include generating the key-value pair.

The methods may include applying spontaneous parametric down conversion to record the key-value pair in the quantum signature vault by quantum entanglement.

The methods may include receiving from the user, after the key-value pair is stored in the vault, a proposed signature.

The methods may include receiving from the user, after the key-value pair is stored in the vault, a proposed fingerprint.

The methods may include identifying, in the quantum signature vault, the quantum phase-space interference matrix based on the key-value pair having a value that corresponds to the proposed fingerprint. The methods may include determining that the quantum phase-space interference matrix matches the proposed fingerprint. The methods may include, prior to the determining, applying to the quantum phase-space interference matrix a quantum error correction.

The methods may include, when the quantum phase-space interference matrix is a recorded quantum phase-space interference matrix, replacing the recorded quantum phase-space interference matrix with a replacement quantum phase-space interference matrix corresponding to a new user signature.

The methods may include, when the quantum phase-space interference matrix is a recorded quantum phase-space interference matrix, before the replacing, applying a quantum error correction circuit to the recorded quantum phase-space interference matrix and the replacement quantum phase space interference matrix to detect a non-noise difference between the recorded quantum phase space interference matrix and the replacement quantum phase space interference matrix.

The methods may include, based on the determining, authorizing a transaction by the user. The methods may include, based on the determining, recording the transaction in a log of user transactions. The methods may include, based on the determining, screening the log using a large language model to detect anomalous authentications.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

The apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the nodes, servers, computing devices, APIs, display monitors, databases and any other part of the disclosure may include some or all of apparatus included in system 100.

Computer 101 may have a processor 103 for controlling the operation of the device and its associated components and may include Random Access Memory ("RAM") 105, Read Only Memory ("ROM") 107, input/output circuit 109 and a non-transitory or non-volatile memory 115. Machine-readable memory may be configured to store information in machine-readable data structures. The processor 103 may also execute all software executing on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of the system 100. memory 115 may also store videos, text and/or audio assistance files. Nodes, servers, computing devices, models, APIs, display monitors, databases and any other suitable computing device as disclosed herein may have one or more features in common with memory 115. The data stored in memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement or keyboard input. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a Wide Area Network ("WAN") networking environment, computer 101 may include a modem 127 or other means for establishing communications over WAN 129, such as Internet 131. Connections between System 100 and Terminals 151 and/or 141 may be used for communication between different nodes and systems within the disclosure.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be configured to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS") and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
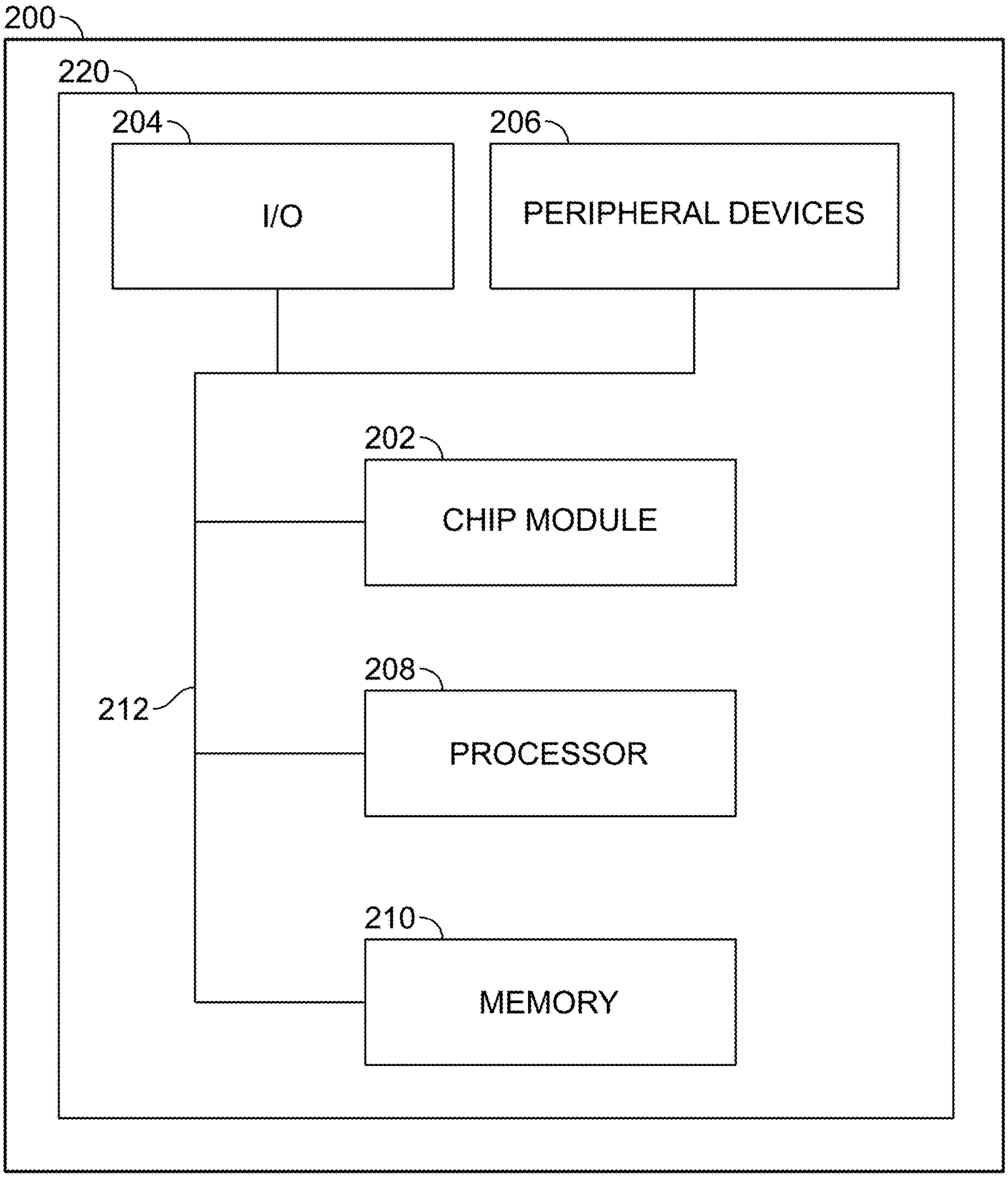
FIG. 2 shows illustrative apparatus that may be used in accordance with the principles of the invention.

FIG. 2 shows illustrative apparatus 200 that may be configured in accordance with the principles of the disclosure. Apparatus 200 may be a computing device. Apparatus 200 may include one or more features of the apparatus shown in FIG. 2000. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
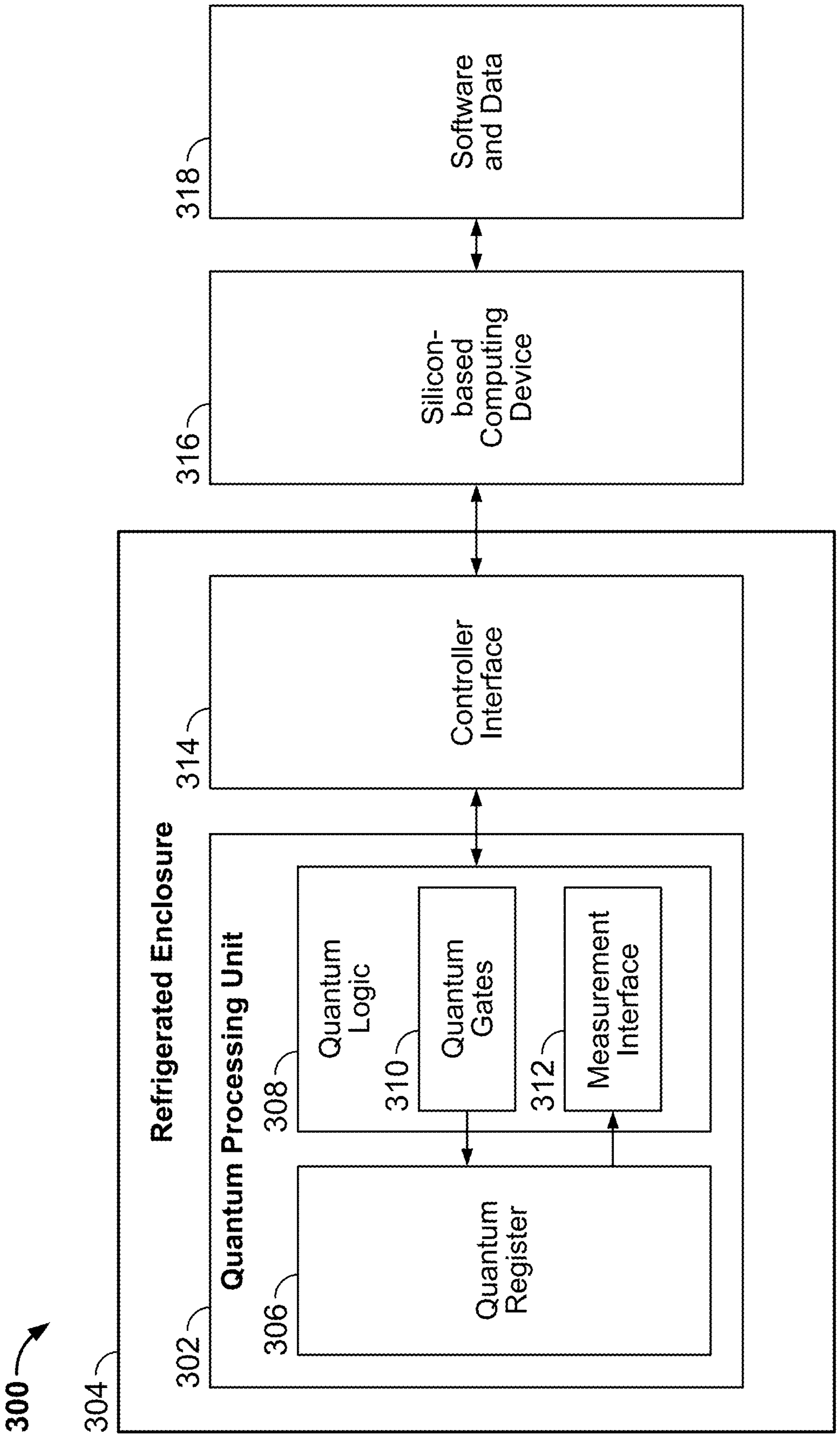
FIG. 3 shows illustrative apparatus that may be used in accordance with the principles of the invention.

FIG. 3 shows illustrative block diagram of system 300. System 300 may include quantum processing unit 302. Quantum processing unit 302 may be a processing unit that uses quantum principles to perform tasks. Quantum processing unit 302 may include quantum register 306. Quantum processing unit 302 may include quantum logic 308. Quantum logic 308 may include quantum gates 310 and measurement interface 312.

Quantum register 306 may be comprised of qubits. Each qubit may have a state of either zero or one, like a classical bit. However, unlike a classical bit, a qubit may have a superposition state. The superposition state may be a state in which the qubit exists as all possible states simultaneously. In order to maintain the qubits in a superposed state, the qubits are preserved at close to absolute zero degrees (kelvin). Refrigerated enclosure 304 may maintain the qubits at close to absolute zero degrees (kelvin).

Quantum gates 310 may include quantum algorithms, such as algorithms based on amplitude amplification, algorithms based on the quantum Fourier transform, algorithms based on quantum walks and/or any other suitable quantum algorithms. Each algorithm may include a series of one or more quantum gates, such as but not limited to identity gates, Pauli gates, controlled gates, phase shift gates, Hadamard gates, swap gates and Toffoli gates. Measurement interface 312 may measure a state of each qubit after being processed by the algorithms included in quantum gates 310. The measured state of each qubit may be a finite state.

The measured state may be transmitted to controller interface 314. Controller interface 314 may enable information to be transmitted between quantum processing unit 302 and silicon-based computing device 316. The measured state may be transmitted to silicon-based computing device 316. Silicon-based computing device 316 may include software and data 318. Software and data 318 may be used to process the measured state that was transmitted from quantum processing unit 302. Silicon-based computing device 316 may transmit data included in software and data 318 to controller interface 314. Controller interface 314 may transmit the data to quantum processing unit 302 to be processed and analyzed.

Figure 4:
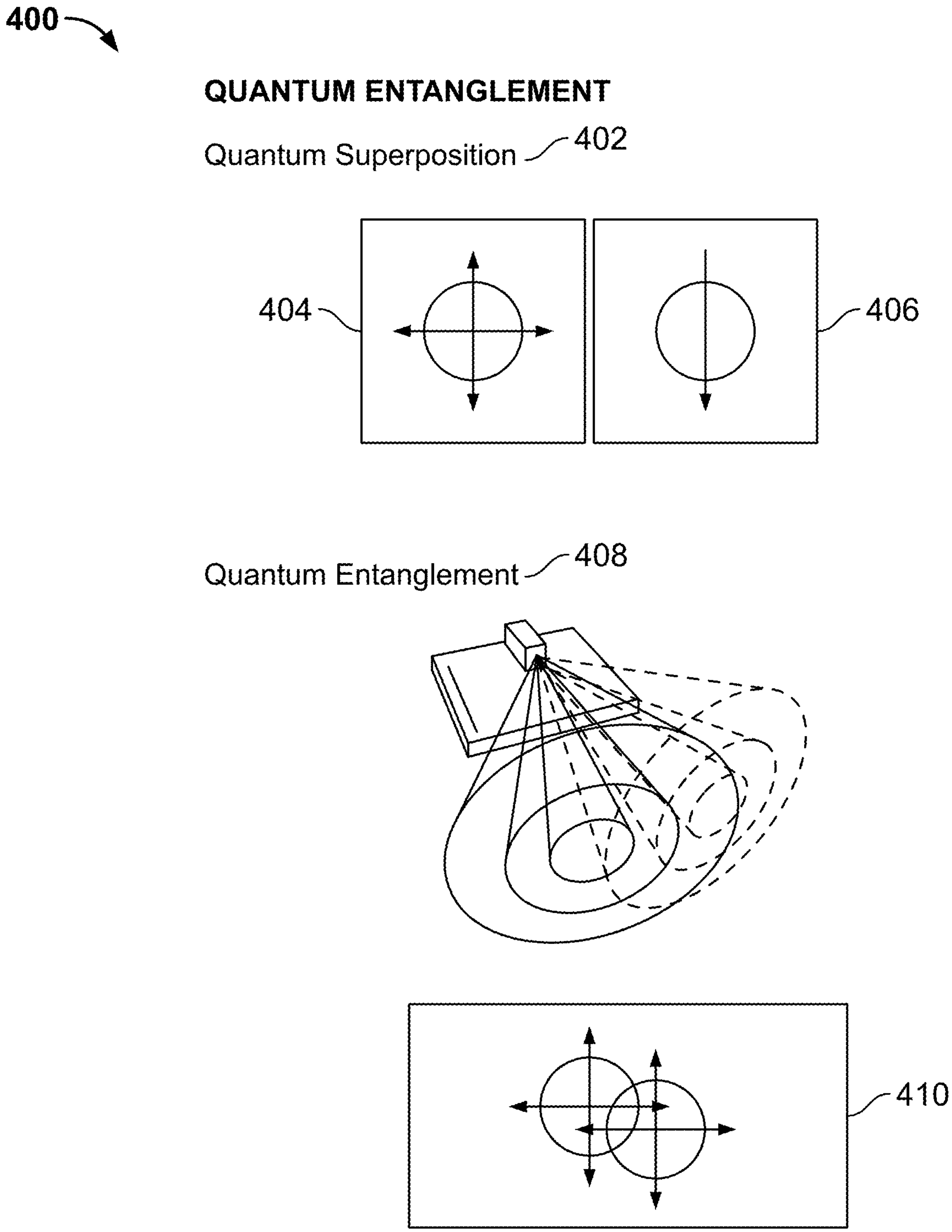
FIG. 4 shows illustrative apparatus that may be used in accordance with the principles of the invention.

FIG. 4 shows illustrative diagram 400. Illustrative diagram 400 may have one or more features in common with system 800. Illustrative diagram 400 may include quantum superposition, as shown at 402. The rules of quantum physics state that an unobserved quantum particle, such as a photon, exists in all possible states simultaneously, as shown at 404. However, when observed or measured, the quantum particle collapses into one state, as shown at 406 (spin-down).

Quantum entanglement, shown at 408, may occur when two quantum particles become connected. A laser beam fired through a certain type of crystal can cause individual photons to be split into pairs of entangled photons. A pair of entangled particles may be shown at 410.

Figure 5:
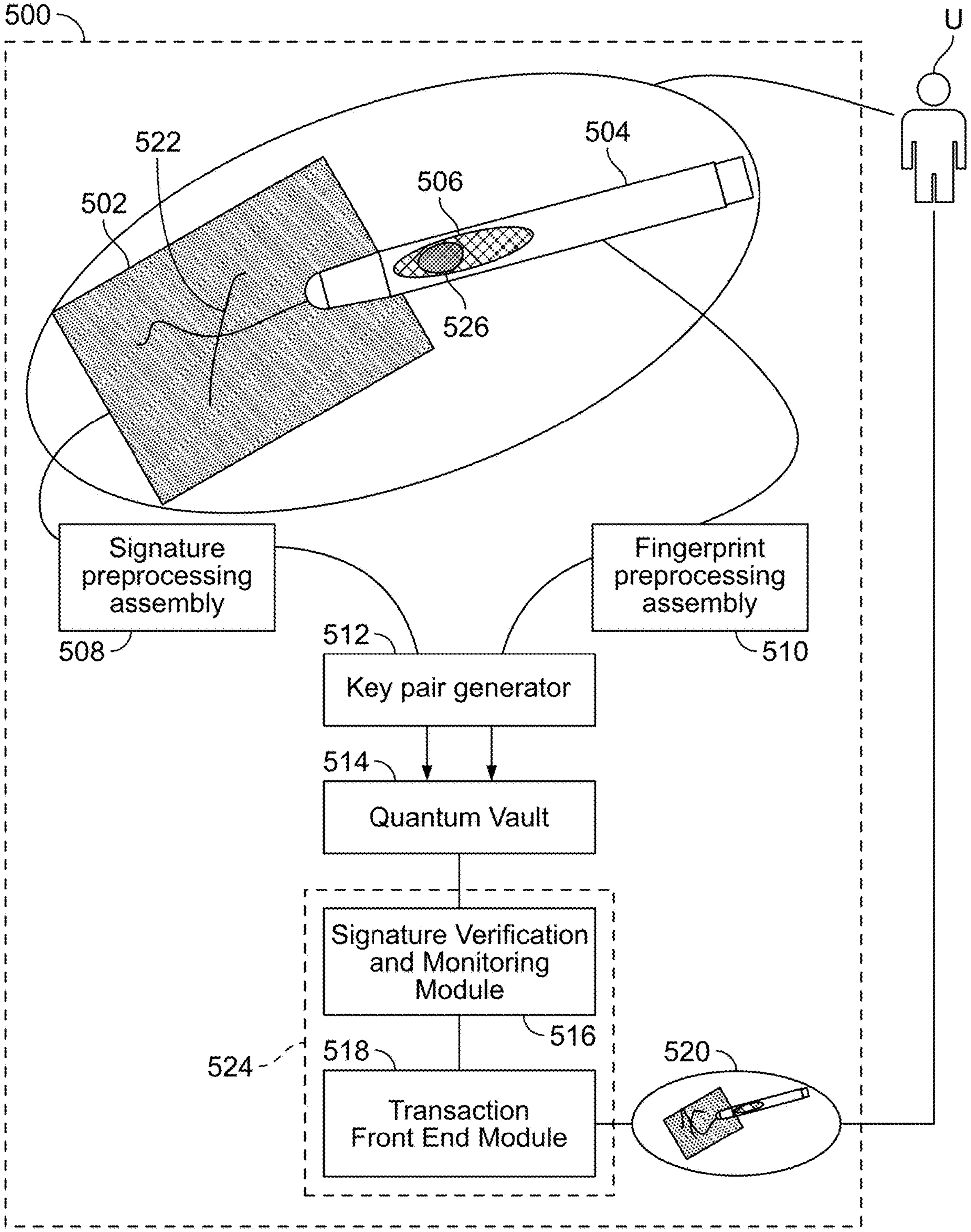
FIG. 5 shows illustrative apparatus in accordance with the principles of the invention.

FIG. 5 shows schematically illustrative apparatus 500 for authenticating a user (U) in connection with a transaction. Apparatus 500 may include holographic signature pad 502. Apparatus 500 may include pen 504. Pen 504 may include fingerprint sensor 506. Apparatus 500 may include signature preprocessing assembly 508. Apparatus 500 may include fingerprint preprocessing assembly 510. Apparatus 500 may include key pair generator 512. Apparatus 500 may include quantum vault 514. Apparatus 500 may include signature verification and monitoring module 516. Apparatus 500 may include transaction front end module 518. Apparatus 500 may include one or more authentication units 520.

User U may use holographic signature pad 502 to provide signature 522 to enterprise 524. User U may use pen 504 to provide fingerprint 526 to enterprise 524 (shown in broken line to indicate that it is not an "apparatus" in the context of apparatus 500).

Signature preprocessing assembly 508 may optically capture signature 522 using digital holographic interferometry. A digitally encoded interference pattern from the signature may be mapped to qubits in a quantum register such as 306. A quantum processing unit such as 302 may be used to apply a quantum Fourier transform to produce a quantum phase space qubit array that corresponds to signature 522. The quantum phase qubit array may include graphological information about signature 522. The graphological information may include a pressure applied by pen 506 to pad 502, a friction between pen 506 and pad 502, a velocity of pen 506 relative to pad 502, graphological features, such as letter spacing, letter forms, letter size, slant, and other suitable graphological features.

The quantum phase space qubit array may be stored in quantum vault 514. In quantum vault 514, the quantum phase space qubit array may be mapped to classical memory. Quantum vault 514 may permit only quantum-resilient communications between quantum vault 514 and any device external quantum vault 514.

Fingerprint sensor 506 may capture a quantum tunneling field from a finger of user U. The field may correspond to fingerprint 526. The field may be charge-based. The field may be current-based. The field may be represented by a wave function.

Fingerprint preprocessing assembly 510 may perform a first level check of the validity of the field. The first level check may result in a PASS or a FAIL. The first level check may check for the presence of the field. The first level check may check the field for a degree of contrast that is acceptable for use as a biometric indicator.

Fingerprint preprocessing assembly 510 may perform quantum cryptography on the field. The cryptography may include post-quantum cryptography. The cryptography may include quantum key distribution ("QKD").

Key-pair generator 512 may define a key-value pair in which the field, or encrypted field, representing fingerprint 526, is the key, and the quantum phase space qubit array that corresponds to signature 522 is the value.

Spontaneous parametric down conversion may be used to copy into quantum vault 514, via entangled photons, one or more of the key, the value and the pairing of the key and the value.

One or more of the key, the value and the pairing of the key and the value may be stored in a quantum register in quantum vault 514. One or more of the key, the value and the pairing of the key and the value may be stored classically in quantum vault 514. One or more of the key, the value and the pairing of the key and the value may be stored classically in a device that is outside of quantum vault 514.

After the key-value pair is stored, user enterprise 524 may use the key-value pair to authenticate user U in connection with a transaction. The transaction may include a request by user U to enterprise 524 to provide to user U information held by enterprise 524 in an account designated for user U. The transaction may include a request by user U to enterprise 524 to provide funds to user U. The transaction may include a request by user U to enterprise 524 to provide funds belonging to user U to a third party.

User U may provide one or both of a proposed signature and a proposed fingerprint to enterprise 524. The proposed signature and the proposed fingerprint may be provided using authentication unit 520. Authentication unit 520 may include a holographic signature pad such as pad 502. Authentication unit 520 may include a fingerprint sensor such as sensor 526. Transaction front end module of enterprise 524 may include use any suitable devices having one or more features included in one or more of signature preprocessing assembly 508, fingerprint preprocessing assembly 510 and key pair generator 512, or may use signature preprocessing assembly 508, fingerprint preprocessing assembly 510 and key pair generator 512 themselves, to generate encrypted quantum representatives of one or both of the proposed signature and the proposed fingerprint.

Signature verification and monitoring module 516 may authenticate the one or both of the proposed signature against one or both of the stored key and corresponding stored value. Signature verification and monitoring module 516 may use the proposed signature to predict the stored key. Signature verification and monitoring module 516 may use the proposed fingerprint to predict the stored value. Signature verification and monitoring module 516 may generate a hash using one or both of the stored key and the stored value to make the prediction. When the stored key or stored value successfully predicts the proposed key or the proposed value, or both, the identity of user U may be authenticated.

Signature verification and monitoring module 516 may be configured to use quantum error correction to distinguish between a stored signature and a new signature. Signature verification and monitoring module 516 may be configured to replace the stored signature with a new signature. The new signature may be stored in quantum vault 514 in the same way that signature 522 is stored in quantum vault 514. Key pair generator 512 may be configured to replace the stored value corresponding to the old signature with a new value corresponding to the new signature. Thus, it may be unnecessary to recapture user U's fingerprint and pair it with the new signature.

Figure 6:
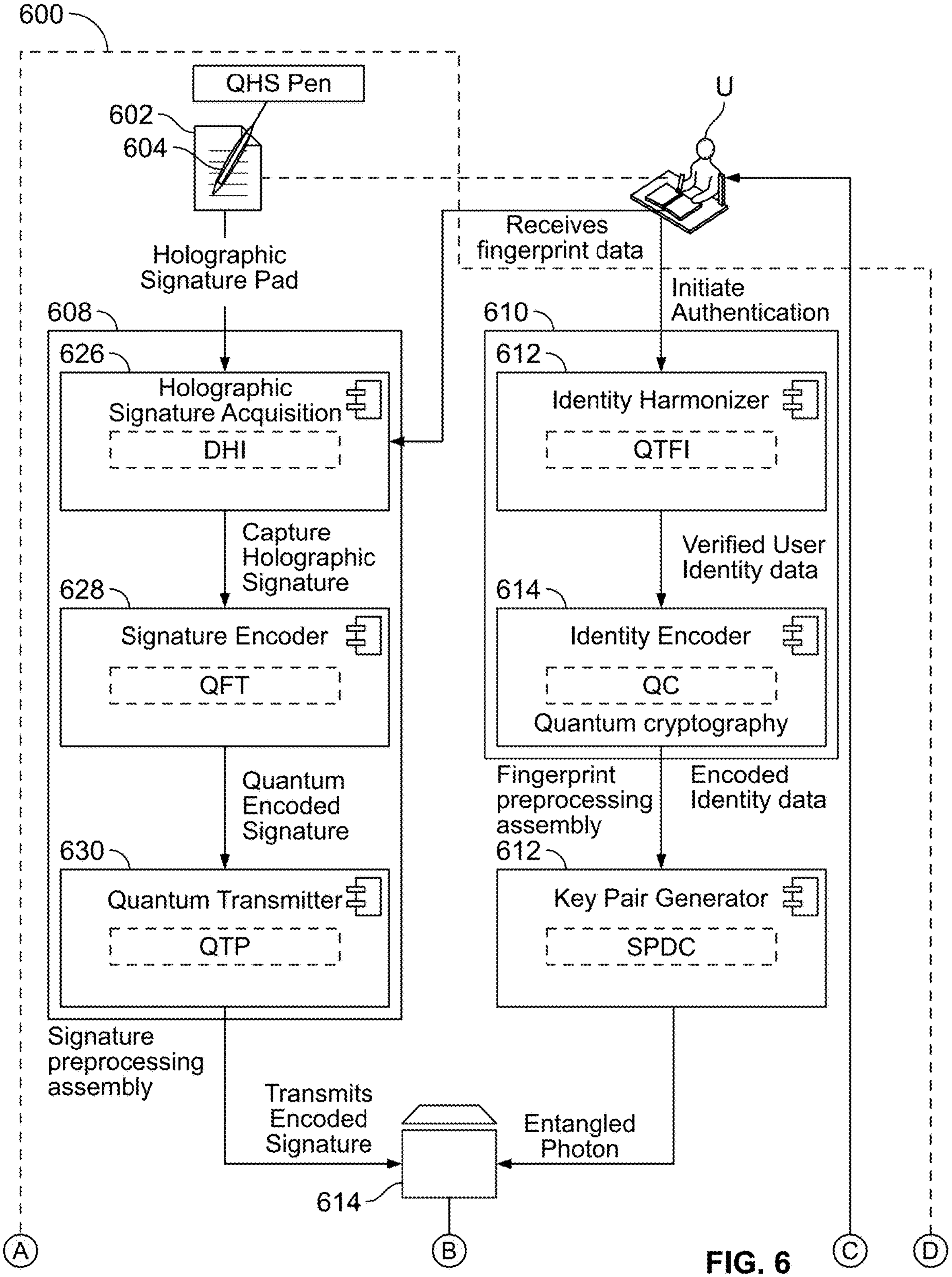
FIG. 6 shows illustrative apparatus in accordance with the principles of the invention.
Figure 6:
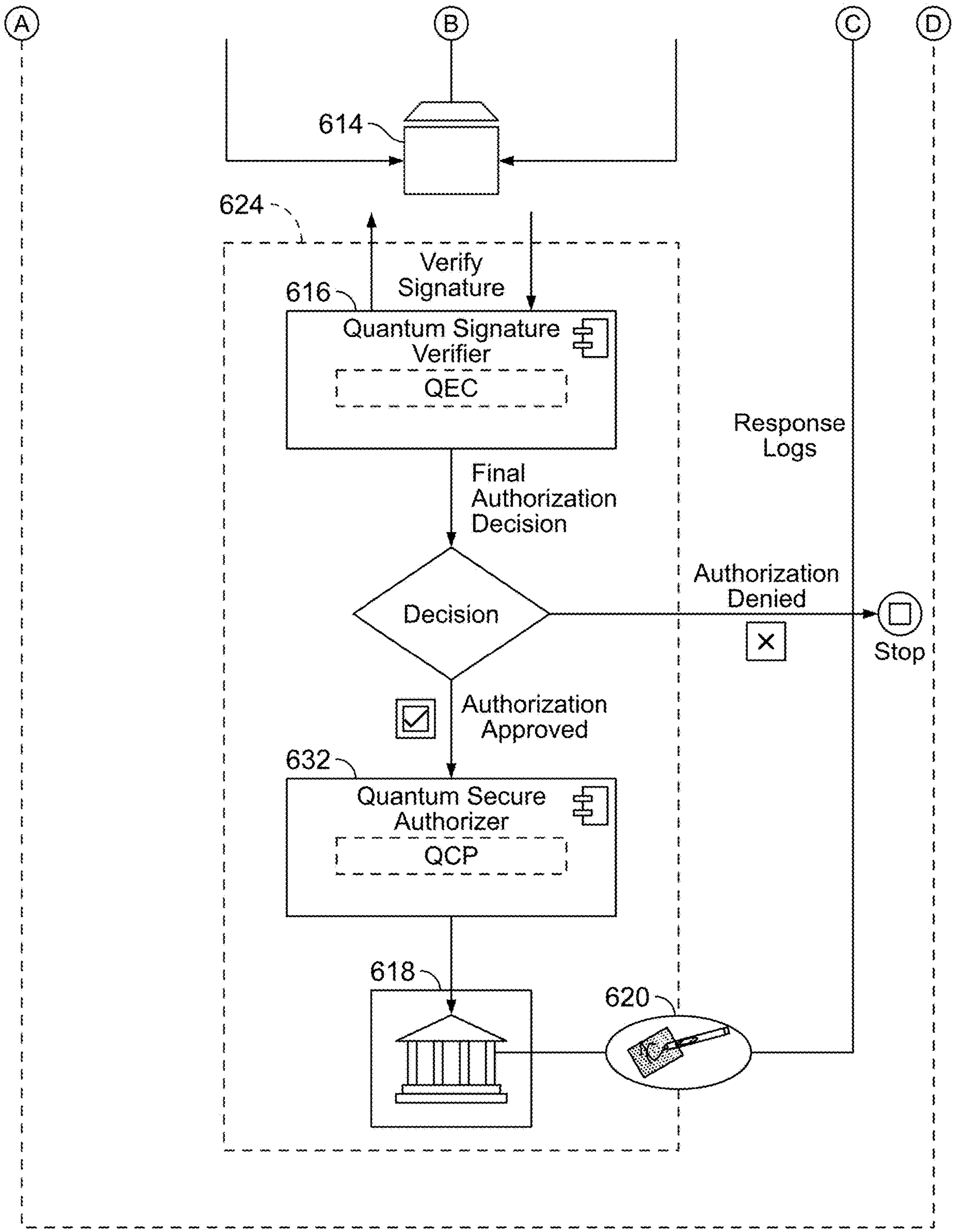

FIG. 6 shows schematically illustrative apparatus 600 for authenticating a user (U) in connection with a transaction.

Table 1 lists acronyms appearing in FIG. 6 along with corresponding terms.

TABLE 1

Acronyms appearing in FIG. 6 along with corresponding terms.

| Acronym | Term |
|---|---|
| QHS | Quantum holographic signature |
| DHI | Digital holographic interferometry |
| QFT | Quantum Fourier transform |
| QTP | Quantum teleportation protocol |
| QTFI | Quantum tunneling fingerprint identification |
| QC | Quantum cryptography |

TABLE 1-continued

| Acronyms appearing in FIG. 6 along with corresponding terms. | |
|---|---|
| Acronym | Term |
| SPDC | Spontaneous parametric down conversion |
| QEC | Quantum error correction |
| QCP | Quantum consensus protocol |

Apparatus 600 may have one or more features or functions in common with apparatus 500. Apparatus 600 may include holographic signature pad 602. Apparatus 600 may include pen 604. Pen 604 may include a fingerprint sensor. Apparatus 600 may include signature preprocessing assembly 608. Apparatus 600 may include fingerprint preprocessing assembly 610. Apparatus 600 may include key pair generator 612. Apparatus 600 may include quantum vault 614. Apparatus 600 may include signature verification and monitoring module 616. Apparatus 600 may include transaction front end module 618. Apparatus 600 may include one or more authentication units 620.

User U may use holographic signature pad 602 to provide signature 622 to enterprise 624. User U may use pen 604 to provide fingerprint 626 to enterprise 624 (shown in broken line to indicate that it is not an "apparatus" in the context of apparatus 600).

Signature preprocessing assembly 608 may include digital holographic interferometer 626. Interferometer 626 may optically acquire a signature such as 522 using digital holographic interferometry. Signature preprocessing assembly 608 may include quantum Fourier transformer unit 628. Quantum Fourier transformer unit 628 may encode a signature from holographic signature pad 602 in quantum phase space. Signature preprocessing assembly 608 may include quantum teleportation protocol unit 630. Quantum teleportation protocol unit 630 may transmit an encoded signature to quantum vault 614.

A fingerprint sensor on pen 604 may capture a quantum tunneling field from a finger of user U. The field may correspond to fingerprint 526.

Fingerprint preprocessing assembly 610 may include identity harmonizer 612. Fingerprint preprocessing assembly 610 may include identity encoder 614.

Identity harmonizer 612 may be configured to capture a quantum tunneling fingerprint field. Identity encoder 614 may be configured to encode the fingerprint field.

Fingerprint preprocessing assembly 610 may pass the encoded fingerprint to key pair generator 612. Entangled photons generated through spontaneous parametric down conversion may be used to place one or more of a key (corresponding to the fingerprint), a value (corresponding to the signature) or the pairing data (linking the fingerprint to the signature) in quantum vault 614.

After the key-value pair is stored, user enterprise 624 may use the key-value pair to authenticate user U in connection with the transaction.

User U may provide one or both of a proposed signature and a proposed fingerprint to enterprise 624. The proposed signature and the proposed fingerprint may be provided using authentication unit 620. Authentication unit 620 may include a holographic signature pad such as pad 602. Authentication unit 620 may include a fingerprint sensor such as sensor 626. Transaction front end module of enterprise 624 may include use any suitable devices having one or more features included in one or more of signature preprocessing assembly 608, fingerprint preprocessing assembly 610 and key pair generator 612, or may use signature preprocessing assembly 608, fingerprint preprocessing assembly 610 and key pair generator 612 themselves, to generate encrypted quantum representatives of one or both of the proposed signature and the proposed fingerprint.

Quantum signature verifier 616 may authenticate one or both of the proposed signature against one or both of the stored key and corresponding stored value.

Quantum signature verifier 616 may use the proposed signature to predict (or "guess") the stored key. Quantum signature verifier 616 may use the proposed fingerprint to predict the stored value. Quantum signature verifier 616 may generate a hash using one or both of the stored key and the stored value to make the prediction. When the stored key or stored value successfully predicts the proposed key or the proposed value, or both, the identity of user U may be authenticated.

Quantum signature verifier 616 may perform quantum error correction to reduce or eliminate random, thermal or other noise that would otherwise reduce the accuracy of a comparison between a proposed signature data set and a stored signature data set or between a proposed fingerprint data set and a stored fingerprint data set.

Transaction front end module 618 may receive one or both of the proposed signature and the proposed fingerprint. Transaction front end module 618 may provide one or both of the proposed signature and the proposed fingerprint to quantum signature verifier 616. Quantum signature verifier 616 may provide front end 618 with an authentication message if the proposed fingerprint corresponds to the stored fingerprint to a level of confidence that exceeds a predetermined threshold.

Quantum secure authorizer 632 may publish determinations of authentication or denial made by quantum signature verifier 616 to logging entities (not shown). The logging entities may accumulate knowledge of proposed signatures and proposed fingerprints, and corresponding authentication decisions by quantum signature verifier 616. This may provide a redundancy based on historical performance of quantum signature verifier 616. The entities may be configured to vote in favor of or against an authentication decision issued by quantum signature verifier 616. If an entity recognizes that such a decision is inconsistent with one or more previous decisions, the entity may vote against the decision. Front end 618 may withhold an authentication decision from user U until a predetermined number of in-favor votes are received from the entities. One or more of the entities may include a large language model that may receive a proposed signature or proposed fingerprint as input. The large language model may be trained on historical institution authentication data to recognize authentic signatures and fingerprints.

Figure 7:
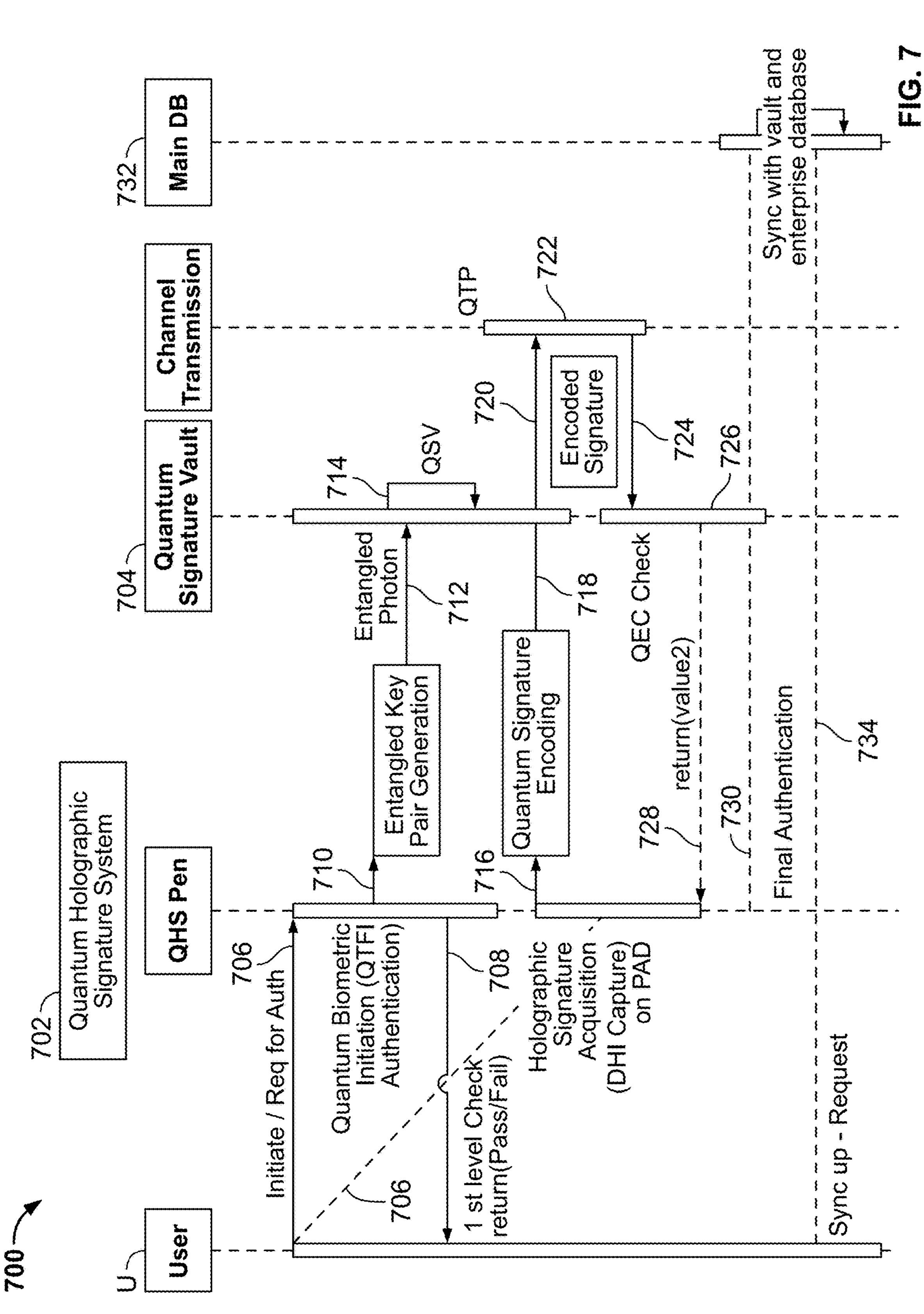
FIG. 7 shows illustrative interactions in accordance with the principles of the invention.

FIG. 7 shows illustrative interactions 700 between user U, quantum holographic signature ("QHS") system 702, quantum signature vault 704 and other apparatus that may have one or more features or functions in common with one or both of apparatus 600 and 700.

In interaction 706, user U may initiate or request authentication from quantum holographic signature system 702. The initiation may correspond to user U providing an enterprise such 524 with an initial signature as a benchmark for a later proposed fingerprint. The initiation may correspond to user U providing an enterprise such 524 with an initial fingerprint as a benchmark for a later proposed fingerprint. The request may correspond to user U providing a signature for authentication or execution of a transaction.

The request may correspond to user U providing a fingerprint for authentication or execution of a transaction.

In interaction 708, quantum holographic signature system 702 may provide a first-level validation of user U's initiation or request.

In interaction 710, quantum holographic signature system 702 may provide a quantum-encoded representation of the fingerprint to a quantum transmitter. In interaction 712, the transmitter may, via entangled photons, provide the encoded fingerprint representation to quantum signature vault 704.

In interaction 714, a quantum signature verifier may validate a proposed signature against a benchmark signature. In interaction 714, a quantum signature verifier may validate a proposed fingerprint against a benchmark fingerprint.

In interaction 716, quantum holographic signature system 702 may provide a quantum representation of a signature to a quantum signature encoder. In interaction 718, the signature encoder may provide an encoded version of the quantum signature to vault 704. If the signature is a proposed signature, the proposed signature may be provided via interaction 720, through quantum teleportation protocol 722, and via interaction 724 to quantum error correction device 726. In interaction 728, quantum error correction device 726 may provide an error check report to quantum holographic signature system 702.

In interaction 730, quantum holographic signature system 702 may provide, via quantum means, classical means, or a combination of quantum and classical means, a final authentication message corresponding to one or more of a signature, a proposed signature, a fingerprint and a proposed fingerprint to vault 704 and enterprise classical database 732.

In interaction 734, user U may request that the enterprise sync user U's quantum authenticated signature or fingerprint with the enterprise's classical records of the authenticated signature or fingerprint. Alternatively in interaction 734, the enterprise may inform user U that user U's quantum authenticated signature or fingerprint has been synced with the enterprise's classical records of the authenticated signature or fingerprint.

For the sake of illustration, the steps of the illustrated processes will be described as being performed by a "system." A "system" may include one or more of the features of the apparatus and schemae that are shown in FIG. 1-FIG. 7 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative process may include steps shown in connection with another illustrative process.

Figure 8:
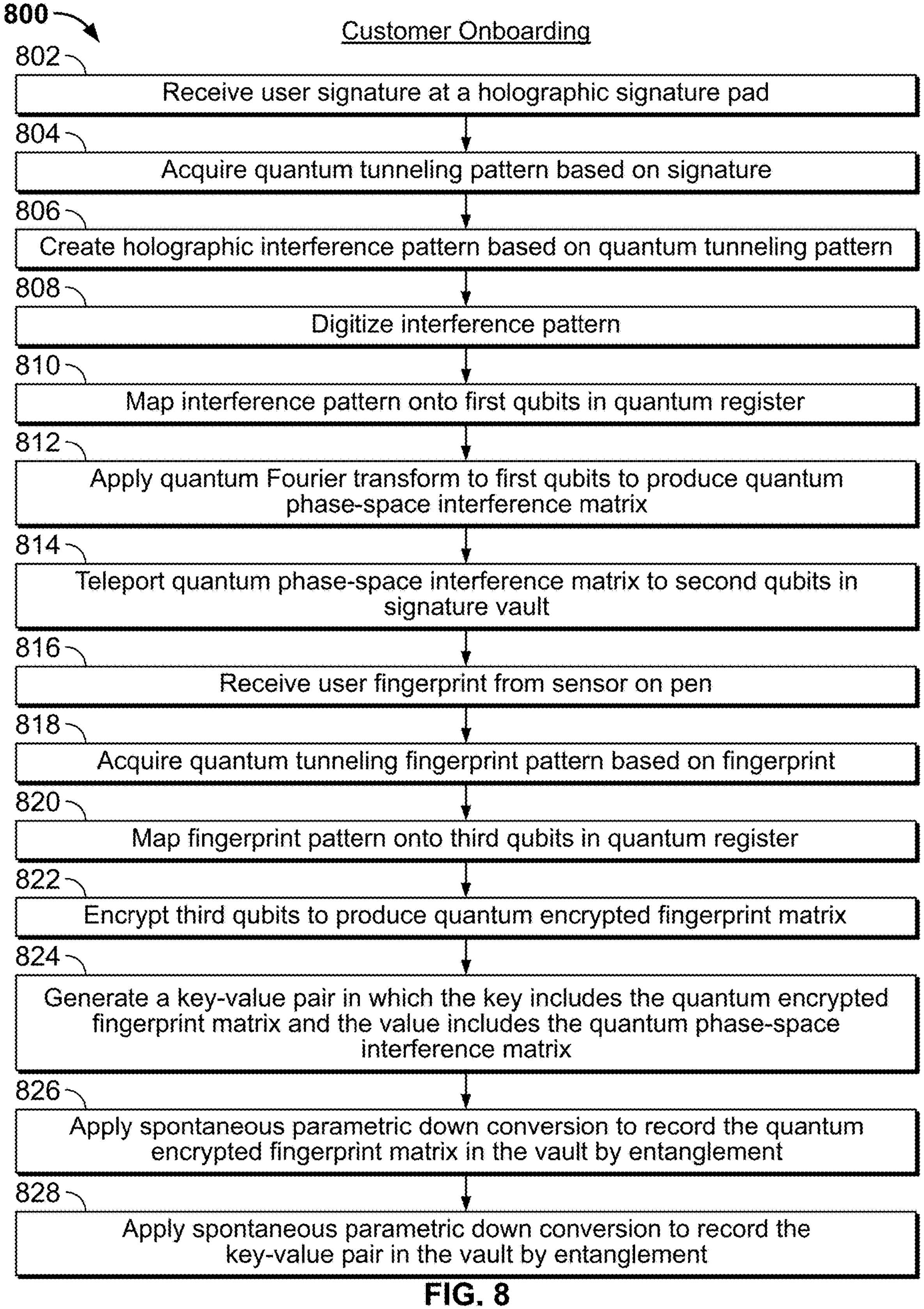
FIG. 8 shows illustrative process steps in accordance with the principles of the invention.

FIG. 8 shows illustrative steps of process 800. Process 800 may begin at step 802. At step 802, the system may receive a user signature at a holographic signature pad. At step 804, the system may acquire a quantum tunneling pattern based on the signature. At step 806, the system may create a holographic interference pattern based on the quantum tunneling pattern. At step 808, the system may digitize the interference pattern. At step 810, the system may map the interference pattern onto first qubits in a quantum register. At step 812, the system may apply a quantum Fourier transform to the first qubits to produce a quantum phase-space interference matrix. The matrix may have any suitable number of dimensions. The cells of the matrix may correspond to qubits that are not physically laid out as a matrix. At step 814, the system may teleport the quantum phase-space interference matrix to second qubits in a signature vault. At step 816, the system may receive a user fingerprint from a sensor on a pen. At step 818, the system may acquire a quantum tunneling fingerprint pattern based on the fingerprint. At step 820, the system may map the fingerprint pattern onto third qubits in a quantum register. At step 822, the system may encrypt third qubits to produce a quantum encrypted fingerprint matrix. At step 824, the system may generate a key-value pair. In the key-value pair, the key may include the quantum encrypted fingerprint matrix and the value may include the quantum phase-space interference matrix. At step 826, the system may apply spontaneous parametric down conversion to record the quantum encrypted fingerprint matrix in the vault by entanglement. At step 828, the system may apply spontaneous parametric down conversion to record the key-value pair in the vault by entanglement.

Figure 9:
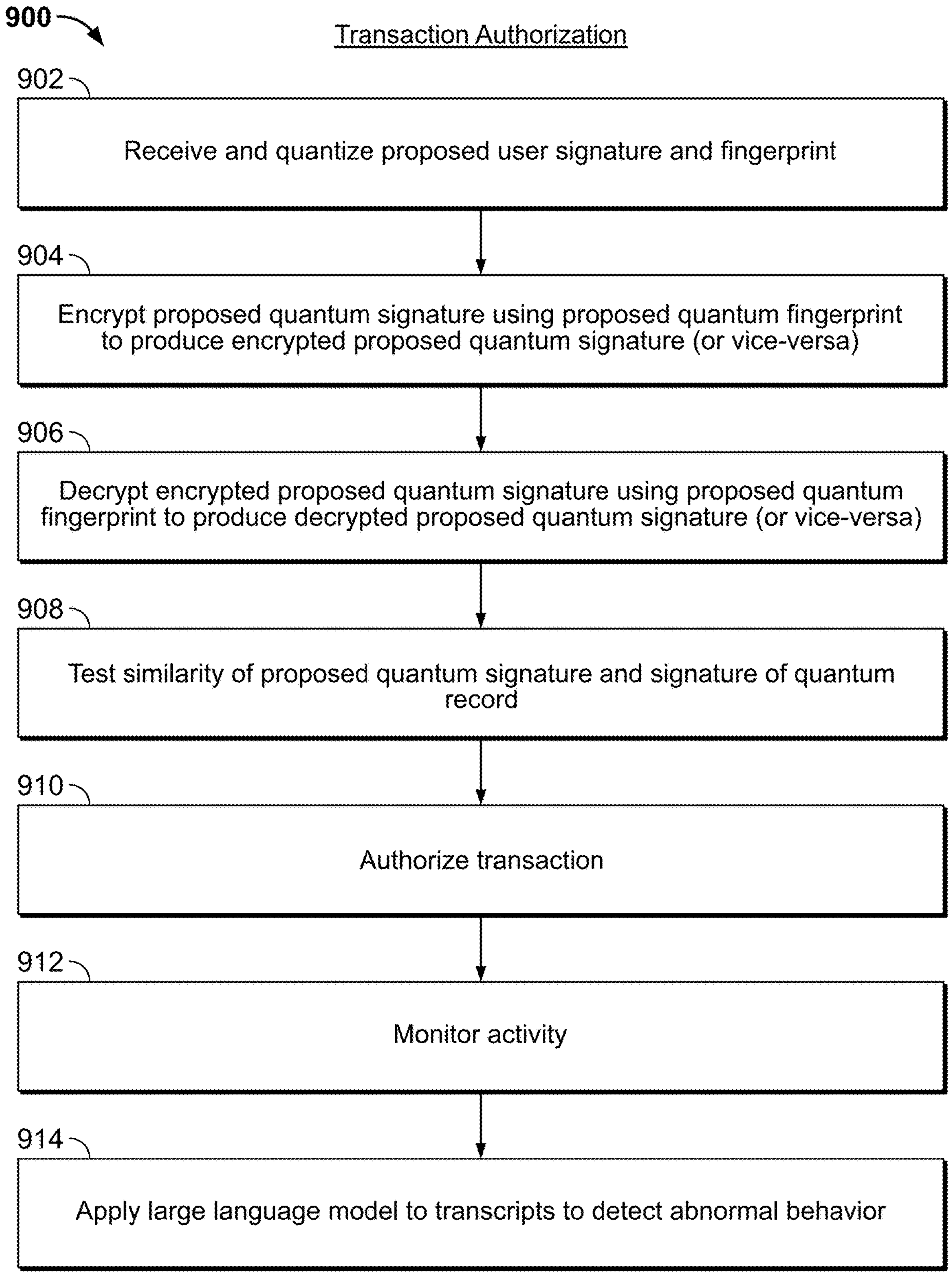
FIG. 9 shows illustrative process steps in accordance with the principles of the invention.

FIG. 9 shows illustrative steps of process 900. Process 900 may begin at step 902. At step 902, the system may receive and quantize a proposed user signature and a proposed user fingerprint. At step 904, the system may encrypt the proposed quantum signature using proposed quantum fingerprint to produce encrypted proposed quantum signature (or vice-versa). At step 906, the system may decrypt the proposed quantum signature using proposed quantum fingerprint to produce decrypted proposed quantum signature (or vice-versa). At step 908, the system may test the similarity or key-compatibility of the proposed quantum signature and the signature of quantum record. At step 910, the system may authorize the transaction. At step 912, the system may monitor activity. At step 914, the system may apply a large language model to transcripts to detect abnormal behavior.

Thus, apparatus and methods for securing a transaction are provided. Persons skilled in the art will appreciate that the present invention can be practiced by other than the described embodiments, which are presented for purposes of illustration rather than of limitation.

What is claimed is:

1. Apparatus for securing a transaction, the apparatus comprising:

- a holographic signature pad that:
  - includes an array of sensors that is configured to sense a first quantum tunneling pattern based on the signature; and
  - is configured to:
    - create a holographic interference pattern based on the first quantum tunneling pattern; and
    - output a digitized holographic interference pattern corresponding to the interference pattern;
  - a classical computer that is configured to instruct a quantum computer to:
    - map the digitized interference pattern onto first qubits in a quantum register;
    - apply a quantum Fourier transform algorithm to the first qubits to produce a quantum phase-space interference matrix; and
    - form a key-value pair that includes a key corresponding to a quantum encrypted fingerprint matrix and a value corresponding to the quantum phase-space interference matrix; and
  - a quantum vault that is configured to house:

signature archive qubits that are entangled with the quantum phase-space interference matrix; and fingerprint archive qubits that are entangled with the quantum encrypted fingerprint matrix.

2. The apparatus of claim 1 further comprising a pen that:

is configured to record a signature on the holographic signature pad;

and includes:

a fingerprint sensor that is configured to acquire a second quantum tunneling pattern based on a fingerprint; and a circuit that is configured to digitize the second quantum tunneling pattern;

wherein the classical computer is configured to:

map the second quantum tunneling pattern onto third qubits in the quantum register; and instruct the quantum computer to encrypt the third qubits to produce the quantum encrypted fingerprint matrix.

3. The apparatus of claim 2 wherein:

the classical computer is further configured to form the key-value pair;

the key is mapped to the signature archive qubits; and the value is mapped to the fingerprint archive qubits.

4. The apparatus of claim 2 wherein:

the classical computer is further configured to instruct the quantum computer to form the key-value pair;

the key is mapped to the signature archive qubits; and the value is mapped to the fingerprint archive qubits.

5. The apparatus of claim 1 comprising, when the classical computer is a first classical computer, a second classical computer that is configured to:

apply quantum error correction to the signature archive qubits; and detect a difference between the signature archive qubits and a proposed quantum signature.

6. The apparatus of claim 5 wherein the proposed quantum signature is a quantum phase-space representation of a signature hologram.

7. The apparatus of claim 1 comprising, when the classical computer is a first classical computer, a second classical computer that is configured to use the quantum computer to:

apply quantum error correction to the fingerprint archive qubits; and detect a difference between the fingerprint archive qubits and a proposed quantum fingerprint.

8. The apparatus of claim 7 wherein the proposed quantum fingerprint is a quantum encrypted representation of a fingerprint pattern.

9. The apparatus of claim 1 comprising, when the classical computer is a first classical computer, a second classical computer that is configured to:

apply a consensus protocol to an input that includes:

output from the holographic signature pad;

output from the sensor;

output from a signature verifier that is configured to manipulate and query and qubits in the vault;

input to the signature verifier from a user; and receive, from a consensus model, using, from the consensus protocol a report indicating an abnormal verification.

10. A method for securing a transaction, the method comprising:

receiving a user signature at a holographic signature pad;

acquiring a first quantum tunneling pattern based on the signature;

creating a holographic interference pattern based on the first quantum tunneling pattern;

digitizing the holographic interference pattern to create a digitized interference pattern;

mapping the digitized interference pattern onto first qubits in a quantum register;

applying a quantum Fourier transform algorithm to the first qubits to produce a quantum phase-space interference matrix;

forming a key-value pair that includes a key corresponding to a quantum encrypted fingerprint matrix and a value corresponding to the quantum phase-space interference matrix;

teleporting the quantum phase-space interference matrix to second qubits in a quantum signature vault; and recording the key-value pair in the quantum signature vault.

11. The method of claim 10 further comprising:

receiving a user fingerprint at a sensor on a pen that is configured to record a signature on the holographic signature pad;

acquiring a second quantum tunneling pattern based on a fingerprint;

digitizing the second quantum tunneling pattern;

mapping the second quantum tunneling pattern onto third qubits in the quantum register; and encrypting the third qubits to produce the quantum encrypted fingerprint matrix.

12. The method of claim 11 further comprising forming the key-value pair.

13. The method of claim 12 further comprising applying spontaneous parametric down conversion to record the key-value pair in the quantum signature vault by quantum entanglement.

14. The method of claim 10 further comprising receiving from the user, after the key-value pair is stored in the vault, a proposed signature.

15. The method of claim 10 further comprising receiving from the user, after the key-value pair is stored in the vault, a proposed fingerprint.

16. The method of claim 14 further comprising receiving from the user, after the key-value pair is stored in the vault, a proposed fingerprint.

17. The method of claim 16 further comprising:

identifying, in the quantum signature vault, the quantum phase-space interference matrix based on the key-value pair having a value that corresponds to the proposed fingerprint; and determining that the quantum phase-space interference matrix matches the proposed fingerprint.

18. The method of claim 17 further comprising, prior to the determining, applying to the quantum phase-space interference matrix a quantum error correction.

19. The method of claim 10 further comprising, when the quantum phase-space interference matrix is a recorded quantum phase-space interference matrix:

replacing the recorded quantum phase-space interference matrix with a replacement quantum phase-space interference matrix corresponding to a new user signature;

before the replacing, applying a quantum error correction to the recorded quantum phase-space interference matrix and the replacement quantum phase space interference matrix to detect a non-noise difference between the recorded quantum phase space interference matrix and the replacement quantum phase space interference matrix.

20. The method of claim 18 further comprising:

based on the determining, authorizing a transaction by the user;

recording the transaction in a log of user transactions; and screening the log using a large language model to detect anomalous authentications.

* * * * *